Nov. 2, 1954  R. H. SPIERS ET AL  2,693,176
SELF-LEVELING COOKING DEVICE
Filed July 17, 1953  2 Sheets-Sheet 1

INVENTORS
Rupert H. Spiers &
George H. Stockstill
BY
McMorrow, Berman & Davidson
ATTORNEYS INVENTORS
Rupert H. Spiers &
George H. Stockstill
BY
McMorrow, Berman & Davidson
ATTORNEYS

2,693,176

Patented Nov. 2, 1954

United States Patent Office

2,693,176

SELF-LEVELING COOKING DEVICE

Rupert H. Spiers, Carrabelle, Fla., and George H. Stockstill, Picayune, Miss.

Application July 17, 1953, Serial No. 368,764

2 Claims. (Cl. 126—24)

This invention relates to cooking devices and more particularly to a cooking unit which will be in a level position at all times due to its self-leveling construction.

Especially in ships and boats where considerable roll and pitch of the vessel is usual, it is highly desirable to maintain the cooking units, and the pots in which the food is being prepared, in a constantly level position. Cooking difficulties due to uneven conditions of movement that prevail in house trailers, railway cars, airplanes, etc., while these means of transportation are in motion will be overcome in the device of this invention.

It is therefore an object of this invention to provide a self-leveling unitary cooking device which will remain level at all times despite uneven movement of the mode of transportation in which the cooking device is being employed.

It is a further object to provide a simply constructed device capable of easy attachment to any surface such as a stove, table or stand top.

If the pots were merely mounted in a support which would maintain the pots in a level position despite the roll and pitch of a ship, there still remains the problem of applying heat uniformly to the bottom of the pot in the same manner as if the pot were setting on a cooking surface in a fixed structure such as a house. Therefore, a still further object of this invention is to provide in a single, complete cooking device in which a pot-leveling support and the source of heat, both moving in concert so that the heat will be continually applied in a uniform manner to the pot (or pots) in which the food is being cooked.

Other objects and advantages will reveal themselves in the following specification, and are particularly pointed out in the claims, taken in conjunction with the drawings, in which:

Figure 3 is a side view looking to the right in Figure 2;

Figure 1:
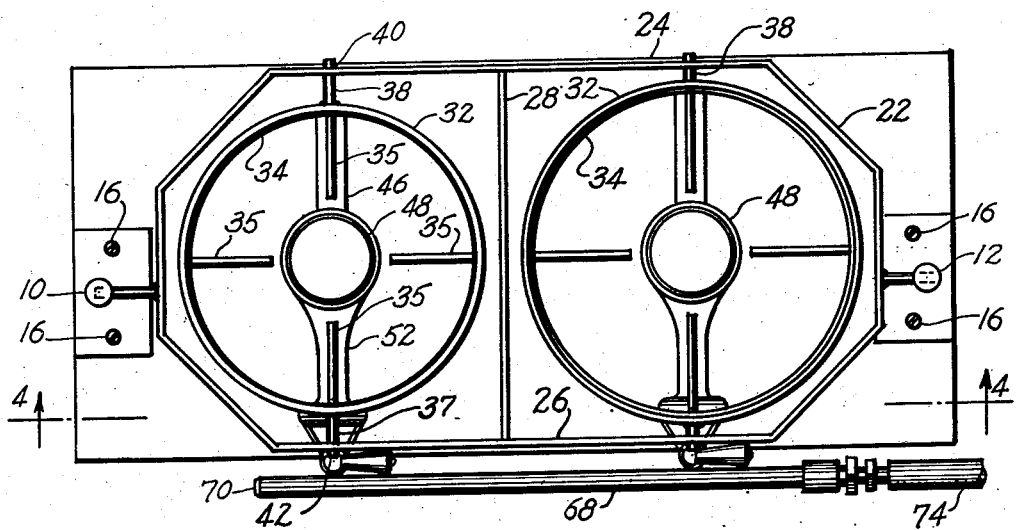
Figure 1 is a top plan view of a cooking device embodying this invention.
Figure 2:
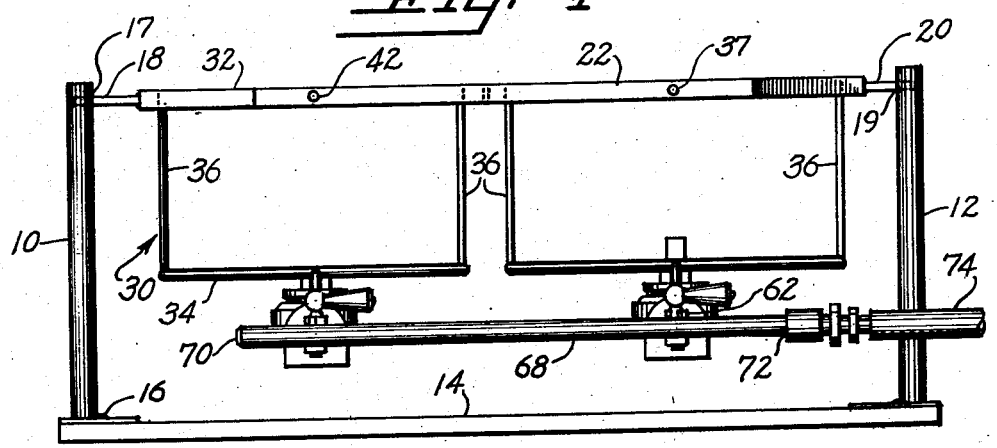
Figure 2 is a front elevational view thereof.

Referring to Figures 1 to 3, it will be seen that a pair of standards 10 and 12 are provided. The standards are adapted to be detachably mounted upon a flat surface, such as that indicated at 14 by suitable securing means such as screws 16. The flat surface may be the top of a stove, a table or a stand. Hence, surface 14 provides a support for the standards 10 and 12 which may be secured thereto in spaced relation. Adjacent the top of each of the standards 10 and 12 is an aperture into which one end of a rod 18 may extend and be pivotally supported therein. It will be noted that rod 18 extends into the aperture in standard 10 while a similar rod 20 has one end which extends into the aperture adjacent the top of standard 12. The rods 18 and 20 at their upper ends are secured to a frame 22 as by welding, brazing or soldering. It should be noted that the point of attachment of the rods to the frame are in alignment but offset from the longitudinal axis of the frame, the purpose of which will appear later. The frame 22 is generally elliptical or as shown in Figure 1, in the form of an elongated octagon and may be made from flat strap metal stock. The elongated sides 24 and 26 are kept in spaced parallel relation by a cross brace member 28 so as to provide rigidity to the frame 22.

The frame 22 carries a plurality of pot supports generally indicated as 30. Each pot support comprises a pair of spaced concentric ring members 32 and 34, the upper ring may be made of the same material as the frame 22, while the lower ring 34, which is of smaller diameter than the upper ring 32, is preferably formed of tubular metal stock. To keep the rings 32 and 34 rigidly in their spaced parallel relation, a plurality of rods 36 are secured at their ends to the upper and lower rings and extend therebetween. A pair of pivot pins 37 are journaled in the sides 24 and 26 respectively of the frame 22 and extend a short distance into the interior of the frame 22. The end of each pin 37 projecting into the interior of the frame is secured to the outer periphery of the upper ring 32 of the pot holder 30 as by welding, etc. It is obvious, of course, that the pot holders 30 may have rings of various sizes so as to accommodate pots or cooking vessels of different dimensions and capacities. Pot holder 30 is adapted to support cooking vessels such as post 38 shown in Figures 4 and 5. The pot 38 will be supported at its bottom 44 upon a plurality of rodlike members 35 (Figure 1) carried by and extending radially from the periphery of ring 34 and each member 35 terminating at a point short of the center of ring 34. Support members 35 are preferably equally spaced about the circumference of ring 34. Also, a number of stops in the form of short pieces of tubular rod 80 project upwardly from ring 34 to further retain pot 38 within the support 30.

Figure 5:
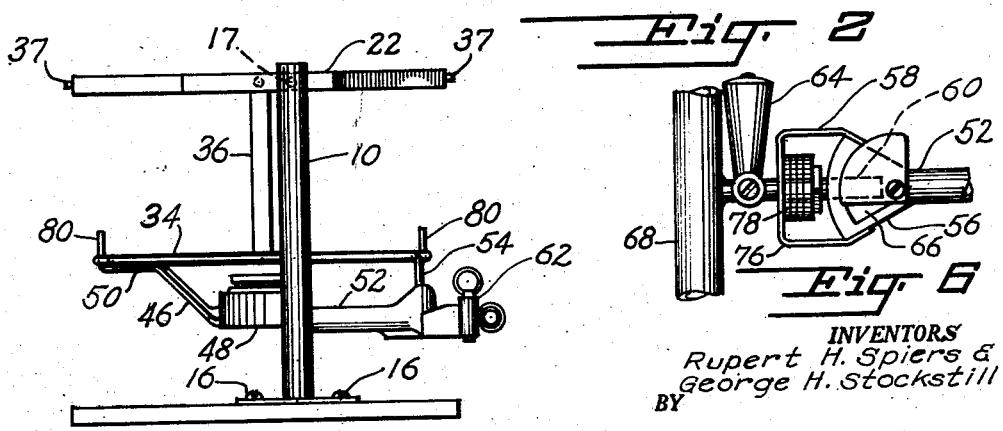
Figure 5 is a view similar to Figure 3 but showing the leveling action of the device as the surface upon which it is mounted is cantered transversely of the device and showing the pots therein.
Figure 4:
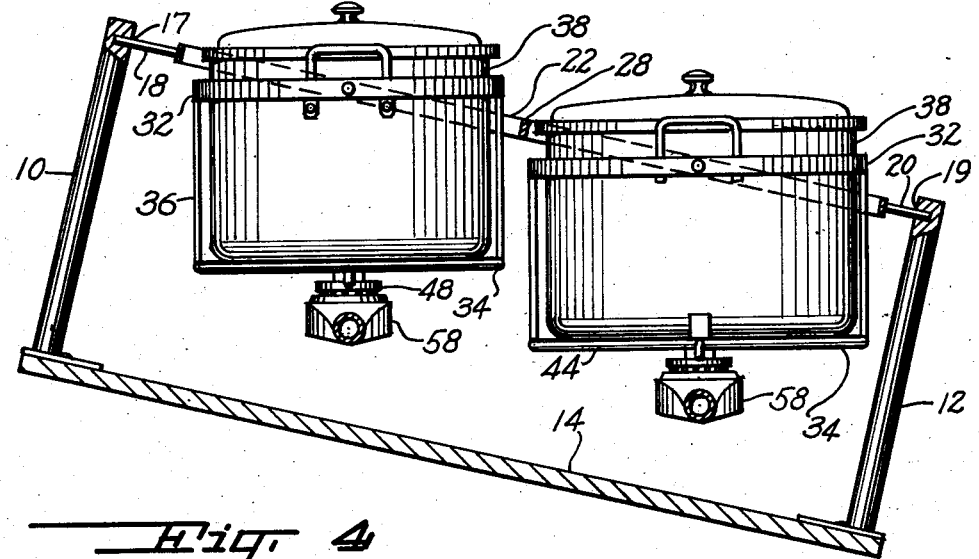
Figure 4 is a view similar to Figure 2 taken on line 4—4 of Figure 3, showing the leveling action of the device as the surface upon which the device is mounted is tilted longitudinally of the device and showing the pots therein.
Figure 5:
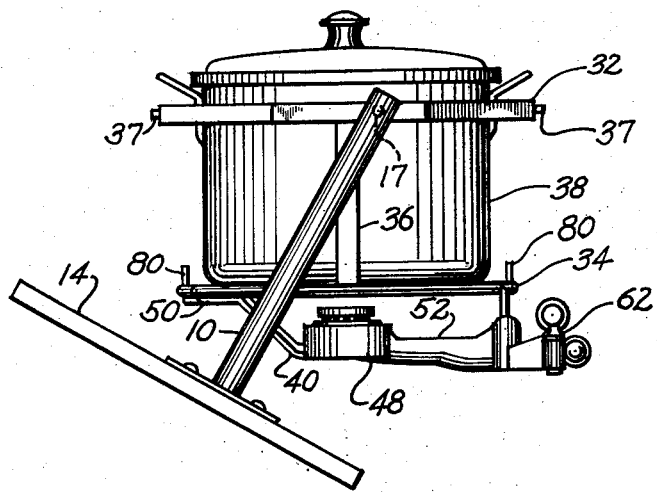

It will be evident from the structure thus far described, that a pot, such as pot 38, when placed in the pot support 30 of the present device, will be capable of maintaining a level position regardless of the inclination or cant of the surface upon which the device is mounted. As shown in Figure 4, when the supporting surface for the device is inclined longitudinally, the pot supports will pivot about the pivot pins 37 journaled in the elongated sides of the frame 22. These pivot points are designated at 40 and 42 and are diametrically opposed one to the other. It should also be noted that the axis of rotation provided by the pivot points 40 and 42 is normal or at right angles to the axis of rotation provided by the short rods 18 and 20 which are journaled in the standards 10 and 12 respectively. Hence, we have a capability of both longitudinal and transverse pivotal movement in the single device. As shown in Figure 5, a transverse cant of the supporting surface for the device will cause the frame 22 to move about an axis of rotation extending between the standards by the pivots provided by short rods 18 and 20 to keep a pot held upon the support 30 in a horizontal position. It will also be clear from the foregoing that a cooking vessel, such as pot 38, will maintain a horizontal position whether the supporting surface is inclined longitudinally or transversely or at any tilted position caused by a combination of the transverse and longitudinal cant.

In order to insure a constant supply of heat to the pot 38 centrally of its bottom 44 which rests upon the lower ring 34 of the pot support, a burner of usual construction is fixedly secured to the lower ring 34 by an arm 46 secured at one end to the lower ring 34 and extending obliquely downward therefrom for attachment to the burner 48. One convenient way to secure the upper portion of the support arm 46 to the lower ring 34 is to provide an integral flat portion 50 (Figure 3) extending immediately below and in the same plane as lower ring 34 and secured to the undersurface of said ring. The burner 48 has the usual integral goose neck 52 which is also supported from the lower ring 34 by means of a short length of rod 54 connected at its ends to the lower ring 34 and the goose neck 52 in any suitable manner. The end of the goose neck opposite its point of connection to the burner 48 is provided with the usual intermixing valve 56 which carries a guard 58 through which extends the hollow tube extension 60 of a shut-off valve 62. The valve 62 comprises an operating handle 64 which may be turned to permit fuel to enter into the mixing chamber 66 of the mixing valve 56 upon rotation in a counterclockwise direction from the position shown in Figure 6. The end of the tube 60 opposite to the end that terminates within the mixing chamber 66 is secured as by welding to a manifold 68 of the usual hollow tube construction having one closed end 70 and an open end 72 carrying a coupling thereon which connects the manifold 68 to a flexible member such as hose 74 which connects the manifold 68 to a source of fuel (not shown).

Figure 6:
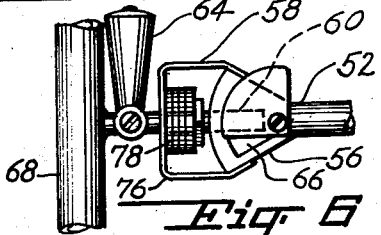
Figure 6 is a bottom plan view of a portion of the burner showing the connection between the burner and its source of fuel.

Referring specifically to Figure 6, it will be seen that the tube extension 60 extends through an aperture in the guard 58 and has a plurality of washers 76 carried thereon and held in abutting relation against the inner front portion 78 of the guard 58. It will also be observed that tube extension 60 provides a point of pivotal movement for the burner 48 at the point where it passes through the guard 58. Hence, it will be seen that the manifold 68 will be kept in its spaced parallel relation with the supporting surface, such as surface 14, regardless of the inclined or canted position taken by the surface 14 since the manifold 68 will pivot about the previously discussed pivot point to maintain this relation permitting a constant supply of fuel to the burner as the burner moves with the pot support 30 in constantly fixed relation thereto.

Referring once again to the offset pivotal connection provided by the short rods 18 and 20 respectively, the purpose of this offset is to equalize the weight so that equal weight will be present on either side of the pivotal points, designated 17 and 19, since the goose neck 52, the shut-off valve 62 and the manifold 68 would otherwise tend to overbalance and cause the frame 22 to turn horizontally about the axis of movement provided by the pivots 17 and 19.

Any number of burners may be secured to the manifold 68 in the manner of attachment of the previously described burner 48. Two such burners are shown in the present device for purposes of illustration. Also, two pot supports are shown as being carried by the frame 22, although obviously as many more pot supports as desired may be carried thereby by the simple expedient of extending the elongated sides 24 and 26 of the frame to the desired length.

From the foregoing it will be seen that there has been provided a single, unitary, complete cooking device in which the source of heat will be in constant fixed relation to a pot in which food is to be prepared regardless of the pitch and roll of a sailing ship or boat in which the device is employed. Further, the pots will remain in a horizontal position at all times despite any inclination or tilt of the surface upon which the device is supported.

While there are shown and described the preferred embodiment of the invention, it is to be understood that the structure is susceptible to change and modification within the practicability of the invention and therefore should be limited only by the scope of the claims appended hereto.

What is claimed is:

1. A self-leveling cooking device adapted to be mounted on a flat surface, comprising a pair of spaced standards, a frame pivotally carried by said standards and extending therebetween permitting movement of the frame about an axis of rotation extending between said standards, a plurality of pot supports in side-by-side relation, each of said pot supports pivotally secured to said frame and each support movable about an axis normal to the axis of rotation of said frame, a plurality of burners, one of said burners fixedly secured to each of said pot supports and movable therewith, a shut-off valve on each burner and a manifold through which fuel is supplied to each burner through the shut-off valve, said manifold having a pivotal connection with each of said shut-off valves so that the manifold will maintain a spaced parallel relation with the pot supports in which pots are to be carried, said pot supports and said burners maintaining their fixed relation regardless of any tilt of the surface supporting the device, and the pots remaining in horizontal position due to the pivotal relation between the standards, the frame and the pot supports.

2. A self-leveling cooking device comprising a pair of spaced standards, a frame pivotally carried by said standards and extending therebetween permitting movement of the frame about an axis of rotation extending between said standards, a pair of spaced pot supports adapted to hold cooking pots, a cross brace member connecting opposite sides of the frame and between said pot supports, each pot support comprising parallel, concentric upper and lower rings, a plurality of rods extending between said rings to maintain them in spaced relation, an obliquely extending arm secured to said lower ring at one end, and a burner secured to the other end of said arm, the burner adapted to centrally underlie a pot supported on the lower ring in fixed spaced relation thereto, a shut-off valve for each burner, and a manifold through which fuel is carried to each shut-off valve through which the fuel may be introduced into the burner associated therewith, pivotal connections between the manifold of each of said valves, said manifold swingable upon the pivotal connections to maintain a spaced parallel relation with the pot supports and the pots held in horizontal position with the burner in said fixed relation thereto regardless of the longitudinal and transverse inclination of the flat supporting surface and the pots remaining in horizontal position due to the pivotal relation between the standards, the frame and the pot supports.

References Cited in the file of this patent

UNITED STATES PATENTS

| Number | Name | Date |
| --- | --- | --- |
| 16,349 | Beardsley | Jan. 6, 1857 |
| 1,319,322 | Berglann | Oct. 21, 1919 |
| 2,520,412 | Jensen | Aug. 29, 1950 |
| 2,578,227 | Chambers | Dec. 11, 1951 |